(No Model.)

J. O. MALOY.
Thill Coupling.

No. 229,047. Patented June 22, 1880.

WITNESSES.

INVENTOR.

UNITED STATES PATENT OFFICE.

JOHN O. MALOY, OF EAST PROVIDENCE, RHODE ISLAND.

THILL-COUPLING.

SPECIFICATION forming part of Letters Patent No. 229,047, dated June 22, 1880.

Application filed April 22, 1880. (No model.)

*To all whom it may concern:*

Be it known that I, JOHN O. MALOY, of East Providence, in the State of Rhode Island, have invented a new and useful Thill Coupling; and I do hereby declare that the following specification, taken in connection with the drawings making a part of the same, is a full, clear, and exact description thereof.

Figure 1:
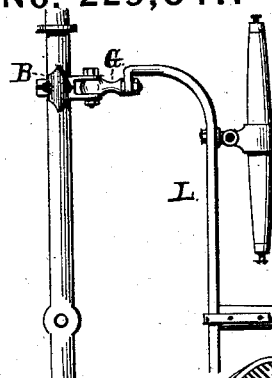
Figure 1:
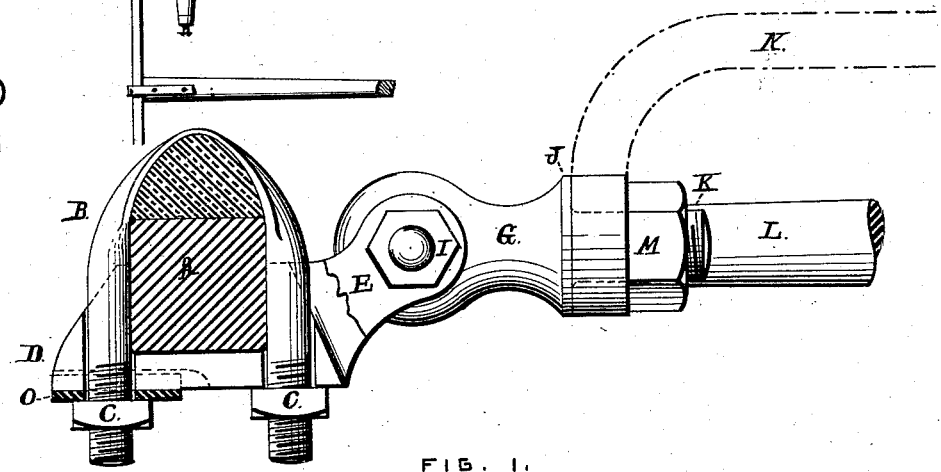
Figure 2:
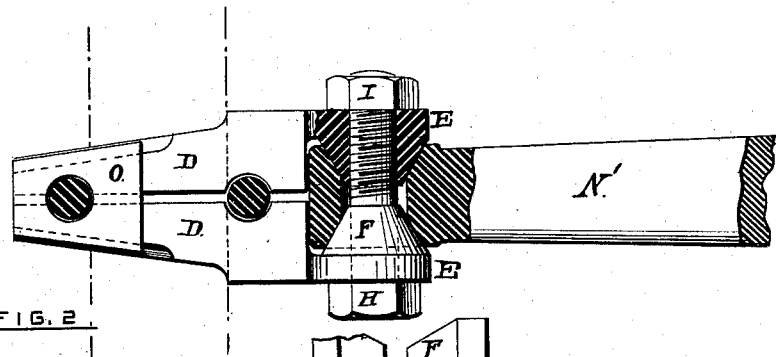
Figure 3:
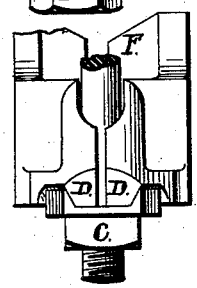

Figure 1 is a section of the axle with my improved device attached thereto. Fig. 2 is a bottom view of the same, a portion of the joint being broken away and showing the bearing. Fig. 3 is a rear view of the same. Fig. 4 shows a section of axle and pole-gear.

The object of my invention is to produce a device that will securely couple the thills or pole with the vehicle so that the same will not become loose or detached, and at the same time permit the rapid and easy substitution of one pair of thills for another or for a pole, if desired.

In the drawings, A, Fig. 1, is the axle, and is composed of a rod or bar of metal, with a strip of wood running lengthwise thereof, in the usual way.

B is the clip, made with a broad flat top to prevent it from cutting into the wood, and is secured underneath the axle by nuts C C. The two ends of the clip B are connected underneath the axle by a yoke composed of two parts, D D, with semicircular slots to receive and secure the rounded ends of the clip. The two parts D D of the yoke have their forward ends extended to form a pair of arms, E E, upon the adjacent surfaces of which are conical bearings F F, which support the arm G, the whole being secured by a screw-bolt, H, which passes through the arms and conical bearings and is retained in its position by a nut, I.

The thills are attached to the straps, of which two kinds are shown. In the first, N', Fig. 2, an eye is made in the end of the strap, consisting of two conical sockets, one upon each side, connected by a cylindrical hole. In the other, N, Fig. 1, the eye is made in an additional piece or arm, G, having a screw-stud, K, which is passed through the ends of the strap N until the latter rests against the shoulder J, when the nut M is put on.

The first form is more particularly designed for use when the removal of the thills, either for the substitution of others or of a pole, is not contemplated. The second is especially adapted for making such changes.

The coupling is adjusted by putting the conical bearings F F into the conical sockets either of the strap N' or of the arm G, as the case may be, and passing the bolt H through the same and securing it by the nut I. The yoke is then applied to the ends of the clip B under the axle and the nuts C C fitted to the projecting ends, the parts D D of the yoke being prevented from spreading apart at the back by the shoe O. The thills are now securely coupled, and the conical bearings will not only prevent any rattling in the first instance, but as they wear off may be easily tightened from time to time, and a close joint at all times maintained.

L, Figs. 1 and 4, is a section of a cross-bar which supports the pole and whiffletrees, and is attached to straps, which are provided at their ends with an eye like the strap upon the thill N, through which passes the screw-stud upon the arm G.

It will now be readily seen that in order to substitute the thills for the pole, or vice versa, it will only be necessary to remove the nut M and the corresponding nut near the other extremity of the axle, when one may be slipped off and replaced by the other and the nuts readjusted.

What I claim as my invention, and desire to secure by Letters Patent, is—

The combination of the clip B, the yoke composed of two movable parts, D D, and having arms E E for the reception of the thill and the shoe O, the whole constructed in the manner substantially as described.

JOHN O. MALOY.

Witnesses:
 WALTER B. VINCENT,
 THOMAS H. O'BRIEN.